US012617248B2

(12) United States Patent
Demmler et al.

(10) Patent No.: US 12,617,248 B2
(45) Date of Patent: May 5, 2026

(54) INDUCTIVE SHOCK ABSORBER

(71) Applicant: AUDI AG, Ingolstadt (DE)

(72) Inventors: Ronny Demmler, Planegg (DE); Jürgen Pöppel, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 508 days.

(21) Appl. No.: 18/163,767

(22) Filed: Feb. 2, 2023

(65) Prior Publication Data

US 2023/0241937 A1     Aug. 3, 2023

(30) Foreign Application Priority Data

Feb. 3, 2022     (DE) .......................... 102022102600.0

(51) Int. Cl.
| | |
|---|---|
| *F16F 15/03* | (2006.01) |
| *B60G 13/14* | (2006.01) |
| *B60G 17/0165* | (2006.01) |
| *B60G 17/06* | (2006.01) |
| *H02K 35/02* | (2006.01) |

(52) U.S. Cl.
CPC ......... B60G 13/14 (2013.01); B60G 17/0165 (2013.01); B60G 17/06 (2013.01); *B60G 2202/25* (2013.01); *B60G 2204/62* (2013.01); *B60G 2206/41* (2013.01); *B60G 2500/104* (2013.01); *B60G 2800/162* (2013.01)

(58) Field of Classification Search
CPC .... B60G 13/14; B60G 17/0165; B60G 17/06; B60G 2202/25; B60G 2204/62; B60G 2206/41; B60G 2500/104; B60G 2800/162; F16F 6/00; F16F 15/03; F16F 2222/06; H02K 35/02; H02K 35/4102; H02K 7/1876; H02K 41/031
See application file for complete search history.

(56) References Cited

U.S. PATENT DOCUMENTS

| | | | | |
|---|---|---|---|---|
| 4,815,575 | A * | 3/1989 | Murty | B60G 17/0157 |
| | | | | 280/5.515 |
| 8,253,281 | B2 * | 8/2012 | Namuduri | H02K 7/1876 |
| | | | | 310/34 |
| 9,035,732 | B2 * | 5/2015 | Satou | H02K 41/031 |
| | | | | 335/229 |
| 9,252,649 | B2 * | 2/2016 | Kakiuchi | F16F 6/00 |
| 9,343,948 | B2 * | 5/2016 | Kakiuchi | F16F 6/00 |
| 10,550,910 | B2 * | 2/2020 | Glanzner | F16F 15/035 |
| 10,690,215 | B2 * | 6/2020 | Sakka | B60G 13/14 |
| 11,270,826 | B2 * | 3/2022 | Yamazaki | H01F 7/16 |
| 11,338,637 | B2 * | 5/2022 | Dhaens | F16F 15/027 |
| 11,652,390 | B2 * | 5/2023 | Pössnicker | H02H 7/0852 |
| | | | | 310/68 C |
| 2003/0034697 | A1 * | 2/2003 | Goldner | F16F 15/03 |
| | | | | 310/15 |

(Continued)

FOREIGN PATENT DOCUMENTS

| | | |
|---|---|---|
| CN | 208134000 U | 11/2018 |
| CN | 209948927 U | 1/2020 |

(Continued)

*Primary Examiner* — Thomas W Irvin
(74) *Attorney, Agent, or Firm* — Seed Intellectual Property Law Group LLP

(57) ABSTRACT

An inductive shock absorber for a motor vehicle is provided having a cylindrical damper tube and a damper rod. A related method for operating a shock absorber is also provided.

13 Claims, 1 Drawing Sheet

(56)  References Cited

U.S. PATENT DOCUMENTS

| | | | | |
|---|---|---|---|---|
| 2010/0219798 A1* | 9/2010 | Namuduri | ............ | H02K 7/1876 |
| | | | | 322/3 |
| 2013/0175886 A1* | 7/2013 | Kakiuchi | .................. | F16F 6/00 |
| | | | | 310/12.18 |
| 2013/0270927 A1* | 10/2013 | Kakuchi | ............. | H02K 41/031 |
| | | | | 310/12.31 |
| 2015/0015352 A1* | 1/2015 | Satou | ...................... | F16F 15/03 |
| | | | | 335/229 |
| 2015/0061244 A1* | 3/2015 | Klein | .................. | B60G 15/062 |
| | | | | 280/5.515 |
| 2017/0219045 A1* | 8/2017 | Glanzner | ............. | F16F 15/035 |
| 2019/0264771 A1* | 8/2019 | Sakka | ....................... | F16F 9/18 |
| 2020/0238780 A1* | 7/2020 | Dhaens | ................. | F16F 15/027 |
| 2021/0101435 A1 | 4/2021 | Yamazaki et al. | | |
| 2024/0404737 A1* | 12/2024 | Makihara | ............. | H01F 7/0205 |

FOREIGN PATENT DOCUMENTS

| | | | |
|---|---|---|---|
| DE | 8222808 | U1 | 12/1982 |
| DE | 3543492 | A1 | 6/1987 |
| DE | 112020000562 | T5 | 10/2021 |
| EP | 1510721 | A1 | 3/2005 |
| FR | 2995561 | A1 | 3/2014 |
| JP | 5876764 | B2 * | 3/2016 |
| WO | WO 2010149149 | A2 | 12/2010 |

* cited by examiner

INDUCTIVE SHOCK ABSORBER

BACKGROUND

Technical Field

An embodiment of the invention includes an inductive shock absorber, such as a chassis damper for a motor vehicle, and a method of operating the shock absorber.

Description of the Related Art

The shock absorber is a safety-relevant component of the chassis. Shock absorbers have the task of dampening vibrations of the vehicle body on the suspension springs and vibrations of the wheels on the tire springs. Without a dampening, the body vibrations in the range of eigenfrequencies would become too large, so that both the ride comfort and the driving safety would be adversely affected. Too much dampening worsens the ride comfort, but improves the road contact. Therefore, the fine tuning between ride comfort and driving safety is always a compromise. By designing the damper in the traction and compression direction for both small and large damper speeds, one can make sure that the demands for driving dynamics and ride comfort are satisfied as much as possible. The traction stage is usually designed to be harsher than the compression stage, to improve the "springing" when hitting ramp-shaped individual obstacles and to achieve a harmonious build-up of the roll angle during quick evasive maneuvers.

In EP 1 510 721 A1 there appears a shock absorber, which performs a telescopic movement as a reaction to a force acting from the outside. The shock absorber has a ball screw mechanism, which converts the telescopic movement into a rotary movement, and which consists of a ball nut and a threaded shaft. A motor is arranged coaxial to the shock absorber. The motor generates an electromagnetic resistance acting against the rotary movement of a shaft of the motor. A cylindrical element is provided, enclosing the shock absorber and the motor on the outside, and its piece covering the motor also serves as the motor frame. A dampening force is generated by the electromagnetic force of the motor, acting against the telescopic movement of the shock absorber.

CN 208134000 U relates to an electromagnetic shock absorber and a control circuit, making possible a recovery of energy. A coil winding regulating circuit is used to realize the multistage regulation of the dampening of the shock absorber. An acceleration sensor measures the irregularities of the road surface and provides feedback to the regulating circuit.

CN 209948927 U discloses a current generating device for an automotive shock absorber, comprising a shock absorbing rod, a cylindrical body, a sliding cavity, an upper shell, an upper connecting piece and a lower shell, a spring, a magnet, a coil, a wire, a support plate, a lower connecting piece, a traction spring, a rotatable connecting piece, and a compression rod. The shock absorbing rod presses the magnet back and forth through the coil by utilizing the downward pressure on the shock absorbing rod generated by the vehicle in the up and down impact process, and current is generated by electromagnetic induction, which can be used by any electrical component in the vehicle.

BRIEF SUMMARY

Some embodiments provide a shock absorber with electrically adjustable dampening characteristic, and which can furthermore be used for generating a current.

Some embodiments include a shock absorber, for example a chassis damper for a motor vehicle having a cylindrical damper tube and a damper rod, which can move in a linear manner inside the damper tube. In the damper rod there is at least one permanent magnet (magnetic core), and in the damper tube there are arranged at least two coils. In one embodiment, the at least two coils are arranged one on top of the other inside the damper tube, i.e., along the longitudinal axis of the cylindrical damper tube.

The shock absorber described herein can be used for example as a chassis damper for a motor vehicle. Other examples of possible uses include a chassis damper in trailers of motor vehicles and utility vehicles, a chassis damper in railway vehicles, seat suspensions, e.g., in trucks or farming vehicles, vibration dampening in ships, in aerospace vehicles, dampers in machine building, in the aerospace industry, dampers in heat pumps or wind turbines, vibration dampers in washing machines, vibration dampers in buildings, and vibration dampers in test stands.

The damper rod can move in linear manner inside the cylindrical damper tube. In addition, springs or a hydraulic medium can be provided in the damper for dampening the movement, depending on the need. In one embodiment, no additional dampening medium is present. The dampening then occurs solely through the inductance.

In the damper rod there is at least one permanent magnet (magnetic core). In one embodiment, a magnetic core is situated near the lower end of the damper rod. In another embodiment, a magnetic core is situated in the middle of the damper rod. In another embodiment, multiple magnetic cores are present in the damper rod, such as two, three or four magnetic cores, which are spaced apart from each other in the longitudinal direction of the damper rod. In another embodiment, the length of the at least one magnetic core is less than the spacing between the at least two coils. In one embodiment of the shock absorber described herein, the damper rod is held in a position of rest by the suspension spring and/or air spring when the shock absorber is not under compression or traction.

The damper tube of the shock absorber contains at least two coils. In one embodiment, the damper tube comprises exactly two coils. In another embodiment, the damper tube comprises more than two coils, such as three, four, or more than four coils. More than two coils enable a further scope of action for the shock absorber. One portion of the coils can then be used to adjust the dampening characteristic and another portion for recovering energy, so that regulating of the dampening and recovery of energy occur at the same time. Also, a more nuanced attuning of the damper action in the comfort range is possible. Thus, for example, a progressive or degressive dampening behavior can be achieved, depending on the compression travel or rebound travel.

In one embodiment, the at least two coils comprise copper coils. In another embodiment, the at least two coils comprise cylindrical coils having an inner diameter which is larger than the outer diameter of the damper rod. In another embodiment, the at least two coils comprise toroidal coils having an inner diameter which is larger than the outer diameter of the damper rod.

In one embodiment, the electrical terminals of the at least two coils are led out from the damper tube. In another embodiment, the electrical terminals of the at least two coils are led through openings in the wall of the damper tube. In another embodiment, the electrical terminals of the at least two coils which are led out are connected to a voltage converter.

In another embodiment, the electrical terminals of the at least two coils are connected to a transmitter for resonant inductive coupling situated in the damper tube, being adapted to transmit electrical energy to a receiver for resonant inductive coupling situated outside the damper tube. In another embodiment, the receiver is connected to a voltage converter.

Some embodiments include a method for operating a shock absorber as described herein. In the method, the dampening characteristic of the shock absorber is regulated by the at least two coils and the kinetic energy of the damper rod is utilized to generate electrical energy, which is taken out from the at least two coils.

In one embodiment of the method, the dampening characteristic of the shock absorber is regulated by conducting an electric current through the at least two coils. In one embodiment of the method, electric currents of different current strength are conducted through the individual coils of the at least two coils. In this way, the coils are magnetized differently and the magnetic core in the damper rod experiences different resistances during a linear movement, corresponding to different hardness stages. This accomplishes an adjustment of the suspension comfort or suspension behavior. The traction stage and the compression stage of the shock absorber can be activated separately and individually, their dampening characteristic can be set, and the reaction times of the dampening can be minimized. The compression travel and rebound travel of the damper rod can also be designed variably and individually.

During a linear movement of the damper rod in the damper tube, the at least one magnetic core is moved past the coils in the damper tube and generates electric energy by induction. The electric energy so generated is picked off from the coils and taken to the onboard network and/or an energy accumulator of the motor vehicle (such as a HV battery, LV battery, or a capacitor). The voltage level of the electric energy obtained can be set at the necessary level by a DC-DC converter, or it can be transformed directly into heat by a heating resistor and used to regulate the thermal conditions in the vehicle (heating, cooling circuit, etc.). The energy transmission can be by cable or by induction. The electric energy can be transferred to the outside already from the coils in the damper tube by cable or by induction from the damper tube. The electric energy can then be transferred by means of cable or via an inductive interface to the onboard network or to an energy accumulator.

In one embodiment of the method, one portion of the at least two coils are used to adjust the dampening characteristic of the shock absorber and another portion of the at least two coils are used to generate electrical energy.

In some embodiments, both electrical energy can be recovered and a damper regulation can be realized. No additional actuators are needed, such as a threaded rod with motor. Since the magnetic core is located in the damper rod, no problems occur due to magnetic attraction of any particles located in the vicinity of the damper tube. Further benefits and embodiments will emerge from the description and the accompanying drawings.

The features explained above and those yet to be explained below can be used not only in the particular indicated combination, but also in other combinations or standing alone.

BRIEF DESCRIPTION OF THE SEVERAL VIEWS OF THE DRAWINGS

Embodiments are shown schematically with the aid of the drawings and shall be further described with reference to the drawings.

DETAILED DESCRIPTION

Figure 1:
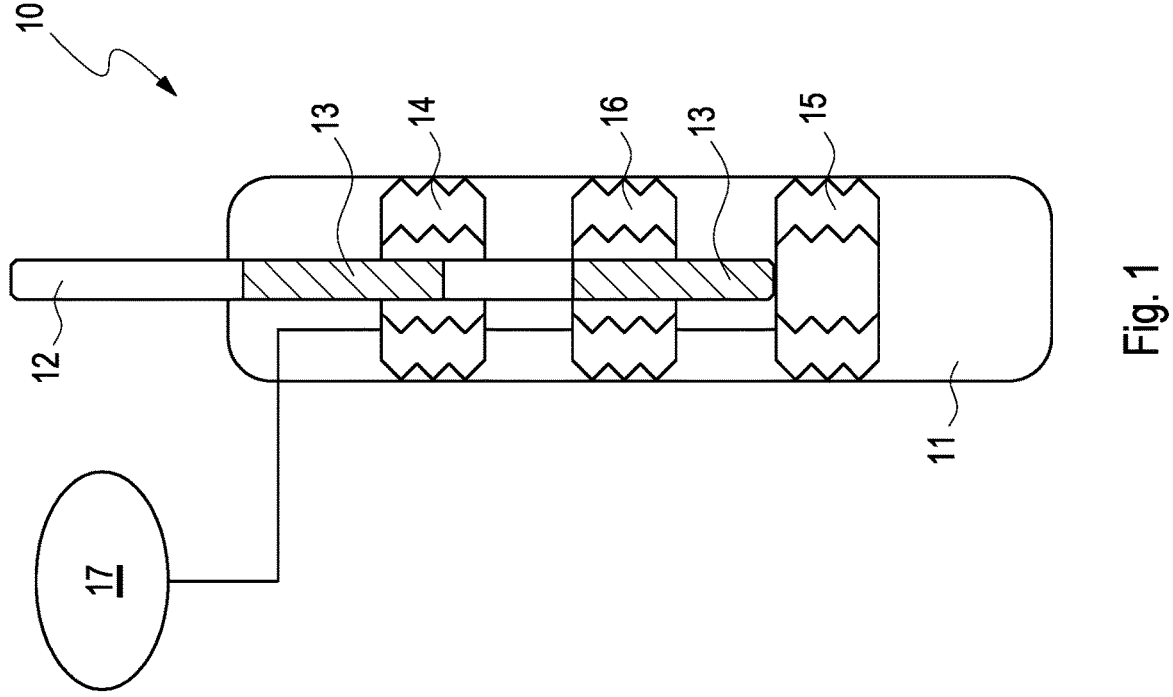
FIG. 1 is a schematic representation of one embodiment of a shock absorber.

FIG. 1 shows schematically a cross section of one embodiment of a shock absorber 10. A damper rod 12 is movable inside a damper tube 11. In the damper rod 12 are arranged two magnetic cores 13. In the damper tube 11 are located a first copper coil 14, a second copper coil 15 and a third copper coil 16, the inner diameter of which is greater than the outer diameter of the damper rod 12. In other embodiments, further additional copper coils can be provided between the first copper coil 14 and the second copper coil 15.

During a linear movement of the damper rod 12 in the damper tube 11, the magnetic cores 13 are moved past the copper coils 14, 15 and 16 and thus electric energy is generated by induction. The electric energy can be picked off from the copper coils 14, 15 and 16 and be taken by cable to a voltage converter (17), which transforms the voltage to a suitable level for feeding it into an onboard network and/or an energy accumulator (such as a HV battery, LV battery, or a capacitor).

In order to set the dampening characteristic, the copper coils 14 and 15 (and possibly also 16) are energized with current differently as needed and thus differently magnetized. The magnetization determines the resistance which the magnetic cores 13 and thus the damper rod 12 experience during a linear movement in the damper tube 11. Thanks to the use of two copper coils 14 and 15, different hardness stages can be set for the traction stage and the compression stage, the dampening of the traction stage being set via the first copper coil 14 and the dampening of the compression stage via the second copper coil 15. The third copper coil 16 can remain non-energized and be used for the energy recovery; or it can be used for fine tuning the dampening behavior. A controller (not shown) controls the voltage converter 17 and the currents through the coils 14, 15, 16 and thus the dampening properties and the energy recovery of the shock absorber 10.

Figure 2:
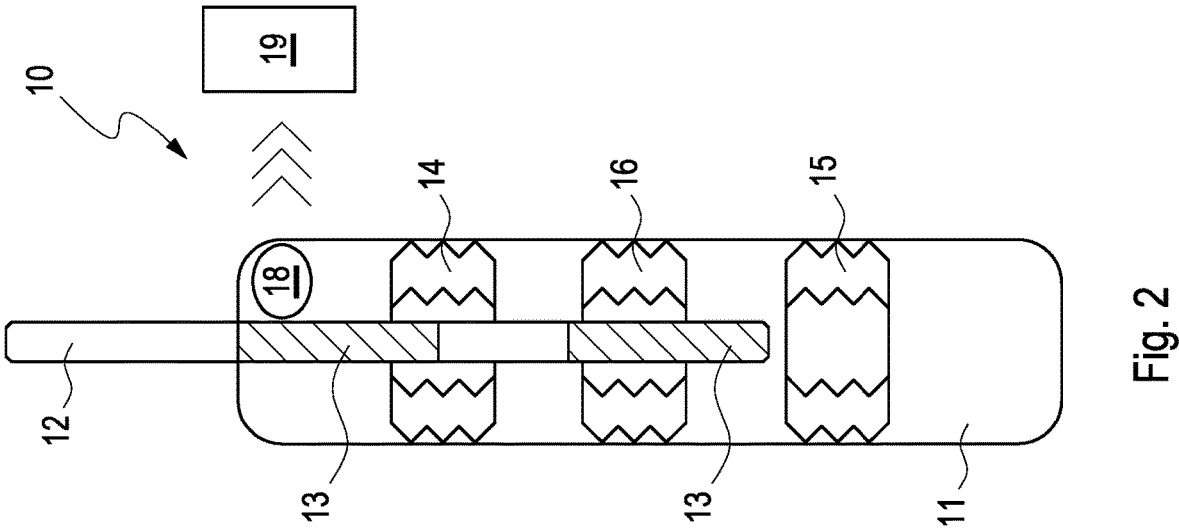
FIG. 2 is a schematic representation of another embodiment of a shock absorber.

FIG. 2 shows schematically a cross section of another embodiment of a shock absorber 10, where the electric energy is not transmitted from the copper coils 14, 15, 16 by cable led out from the damper tube 11, but instead by inductive energy transmission. The copper coils 14, 15, 16 are connected to an induction pickup 18, comprising a transmitter adapted for resonant inductive coupling with a receiver 19 situated outside the damper tube 11. The transmitter of the induction pickup 18 is designed to transmit electric energy to the receiver 19, which feeds a voltage converter. A controller (not shown) controls the voltage converter 19 and the currents through the coils 14, 15, 16 and thus the dampening properties and the energy recovery of the shock absorber 10.

German patent application no. 10 2022 102600.0, filed Feb. 3, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A shock absorber for a motor vehicle, comprising:
a cylindrical damper tube; and
a damper rod, which can move in a linear manner inside the damper tube, and in which at least one permanent magnet is situated, wherein at least two coils are arranged in the damper tube, wherein a first coil and a second coil of the at least two coils are configured to be energized, during operation, by electric currents of different current strength simultaneously to regulate dampening characteristics of the shock absorber.

2. The shock absorber according to claim 1, wherein the at least two coils are arranged one on top of the other inside the damper tube.

3. The shock absorber according to claim 1, wherein the at least two coils comprise cylindrical coils having an inner diameter which is larger than the outer diameter of the damper rod.

4. The shock absorber according to claim 1, wherein the at least two coils comprise toroidal coils having an inner diameter which is larger than the outer diameter of the damper rod.

5. The shock absorber according to claim 1, comprising exactly two coils.

6. The shock absorber according to claim 1, comprising more than two coils.

7. The shock absorber according to claim 1, wherein the electrical terminals of the at least two coils are led out from the damper tube.

8. The shock absorber according to claim 1 wherein the first coil of the at least two coils is configured to set dampening of a traction stage of the shock absorber.

9. The shock absorber according to claim 1 wherein the second coil of the at least two coils is configured to set dampening of a compression stage of the shock absorber.

10. The shock absorber according to claim 1, further comprising a third coil, wherein the third coil is configured to remain non-energized and to be used for energy recovery.

11. The shock absorber according to claim 1, further comprising a third coil, wherein the third coil is configured for fine tuning the dampening behavior of the shock absorber.

12. A method for operating a shock absorber of a motor vehicle, the shock absorber including a cylindrical damper tube and a damper rod that can move linearly inside the damper tube, wherein the damper tube includes at least two coils and the damper rod includes at least one permanent magnet, the method comprising:
regulating a dampening characteristic of the shock absorber by conducting electric currents of different current strength simultaneously through individual coils of the at least two coils; and
using kinetic energy of the damper rod to generate electrical energy; and
taking the energy out from the at least two coils.

13. The method according to claim 12 wherein a first individual coil of the at least two coils is configured to set dampening of a traction stage of the shock absorber and a second individual coil of the at least two coils is configured to set dampening of a compression stage of the shock absorber.

* * * * *